United States Patent
Kowalski et al.

(10) Patent No.: US 7,331,625 B2
(45) Date of Patent: Feb. 19, 2008

(54) GARMENT HOOK ASSEMBLY

(75) Inventors: Steven Martin Kowalski, Royal Oak, MI (US); David J. Krysiak, Pleasant Ridge, MI (US)

(73) Assignee: Intier Automotive Inc., Newmarket (CA)

( * ) Notice: Subject to any disclaimer, the term of this patent is extended or adjusted under 35 U.S.C. 154(b) by 0 days.

(21) Appl. No.: 10/558,353

(22) PCT Filed: Apr. 27, 2004

(86) PCT No.: PCT/US2004/012877

§ 371 (c)(1), (2), (4) Date: Nov. 23, 2005

(87) PCT Pub. No.: WO2004/208478

PCT Pub. Date: Dec. 16, 2004

(65) Prior Publication Data

US 2006/0267365 A1 Nov. 30, 2006

Related U.S. Application Data

(60) Provisional application No. 60/474,491, filed on May 30, 2003.

(51) Int. Cl.
*B60J 5/00* (2006.01)

(52) U.S. Cl. .................. 296/152; 296/146.1; 296/1.07; 296/146.8

(58) Field of Classification Search ........... 296/187.05, 296/146.1, 152, 1.02, 1.07, 1.08, 210, 214, 296/146.8; 224/313, 311
See application file for complete search history.

(56) References Cited

U.S. PATENT DOCUMENTS

| | | | | |
|---|---|---|---|---|
| 2,609,104 | A * | 9/1952 | Leach | 224/482 |
| 3,385,547 | A * | 5/1968 | West | 248/308 |
| 3,636,745 | A * | 1/1972 | Green | 70/281 |
| 4,671,556 | A | 6/1987 | Lynas, III | |
| 4,720,028 | A * | 1/1988 | Takemura et al. | 224/553 |
| 4,981,323 | A * | 1/1991 | Dowd et al. | 296/214 |
| 5,226,569 | A * | 7/1993 | Watjer et al. | 224/313 |
| 5,507,423 | A * | 4/1996 | Fischer et al. | 224/313 |
| 6,109,579 | A | 8/2000 | Huang | |
| 6,422,524 | B1 * | 7/2002 | Spagnuolo et al. | 248/307 |
| 6,502,731 | B1 | 1/2003 | Gehring et al. | |
| 6,692,067 | B2 * | 2/2004 | Inari et al. | 296/214 |
| 6,959,954 | B2 * | 11/2005 | Brandt et al. | 296/1.08 |
| 6,968,601 | B2 * | 11/2005 | Bivens et al. | 24/369 |
| 2003/0141423 | A1 * | 7/2003 | Gordon | 248/304 |
| 2004/0060953 | A1 * | 4/2004 | Karner | 224/311 |

FOREIGN PATENT DOCUMENTS

| | | |
|---|---|---|
| DE | 44 40 520 | 3/1996 |
| GB | 1 052 859 | 12/1996 |

\* cited by examiner

*Primary Examiner*—Jason Morrow
(74) *Attorney, Agent, or Firm*—Honigman Miller Schwartz and Cohn LLP

(57) ABSTRACT

A closure panel assembly for a vehicle comprising a closure panel capable of movement between an open position and a closed position, and a garment hook assembly mounted to the closure panel. When the closure panel is closed, the garment hook is presented to an interior space of the vehicle.

13 Claims, 1 Drawing Sheet

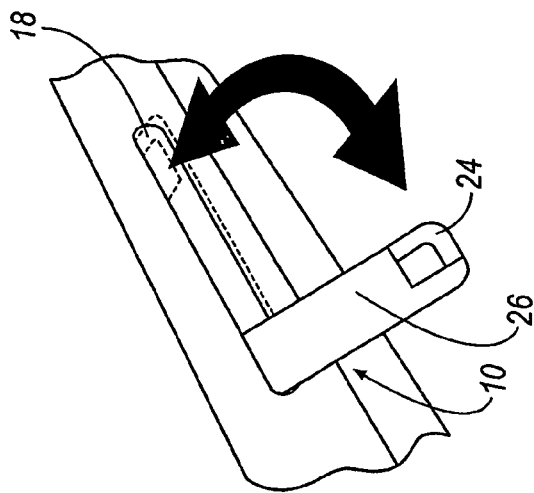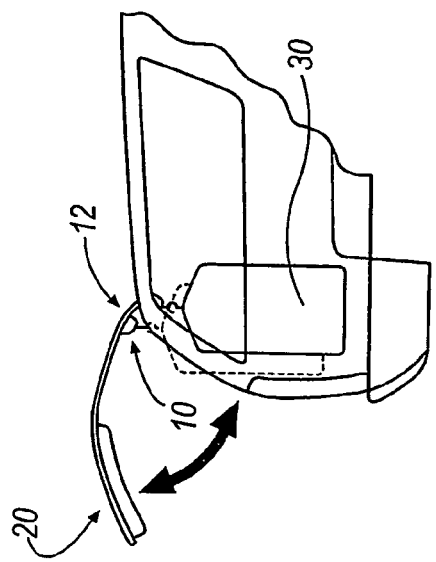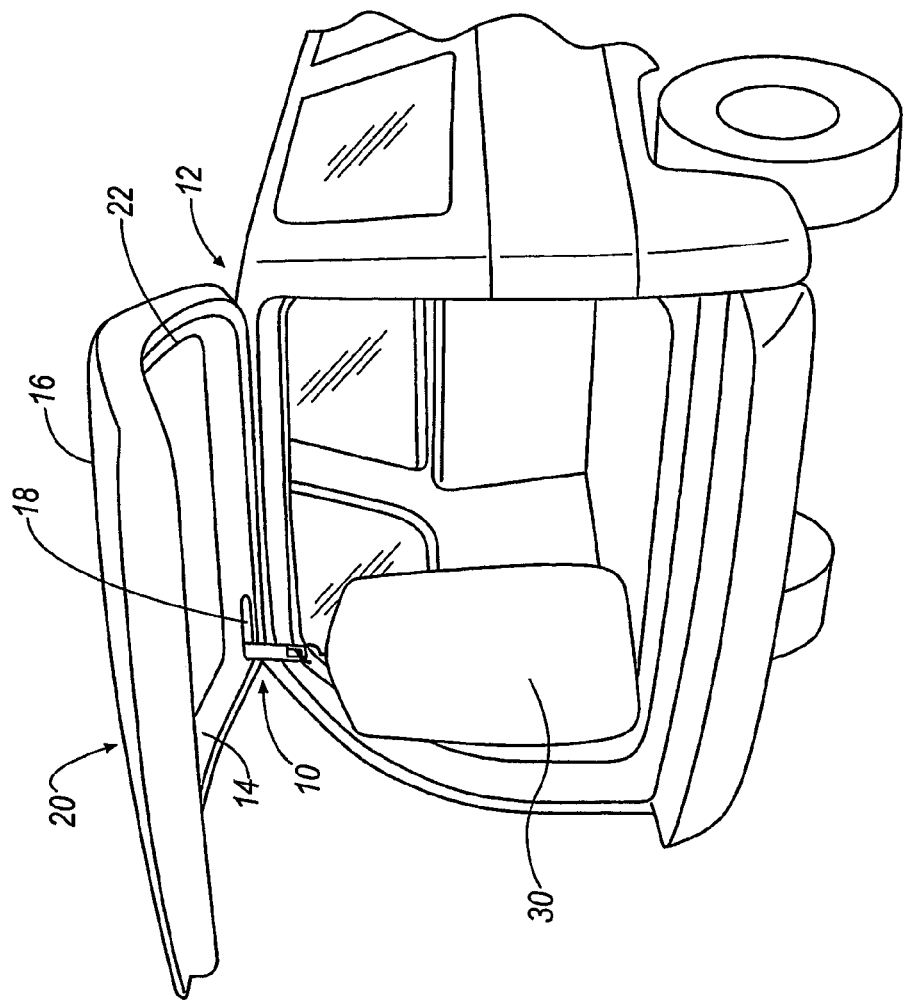

GARMENT HOOK ASSEMBLY

TECHNICAL FIELD

The present invention relates to an interior accessory for a vehicle and in particular to a garment hook on the rear door or liftgate of a vehicle.

BACKGROUND

Typically vehicles are provided with relatively small hooks placed on either side of the headliner of the vehicle behind the front seat for receiving clothes hangers. Such hooks project from the upholstery of the headliner of the vehicle and may be unsightly. The protruding hooks may also present a safety hazard in the form of a projection against which a person may bump their head either while entering or exiting the vehicle, or in the event of an accident. Moreover, when the hooks are used, the clothes restrict the visibility of the rear windows. Furthermore, the hooks are relatively small and cannot accommodate more than a few hangers.

SUMMARY OF THE INVENTION

The inventor of the present invention has recognized these and other problems associated with garment hooks. To this end, the inventor has developed a garment hook assembly comprising a hook portion and a base portion pivotally mounted to an inner panel of a vehicle. The garment hook assembly is automatically deployed when the inner panel is moved from a raised position to a lowered position.

BRIEF DESCRIPTION OF THE DRAWINGS

The present invention will now be described, by way of example, with reference to the accompanying drawings, in which:

FIG. 1 is a perspective view of the garment hook assembly in its lowered and raised position.

FIG. 2 is a perspective view of the garment hook assembly in its lowered position within a sports utility vehicle.

FIG. 3 is a side view of the garment hook assembly in its lowered position within a sports utility vehicle.

DESCRIPTION OF THE PREFERRED EMBODIMENT

Referring to FIGS. 1 and 2, a garment hook assembly 10 is shown according to one embodiment of the present invention. The garment hook assembly 10 is positioned on a liftgate assembly 20 within a vehicle 12. The liftgate assembly 20 includes an inner panel 14 and an outer panel 16. The inner panel 14 of the liftgate assembly 20 has a recess 18 for housing the garment hook assembly 10.

As best seen in FIG. 1, the garment hook assembly 10 comprises a hook portion 24 and a base portion 26. The hook portion 24 and the base portion 26 are located on opposite ends of the garment hook assembly 10. In the illustrated embodiment of the present invention, the hook portion 24 can be made from a metal material and the base portion 26 can be made from a plastic material. However, it can be appreciated that the garment hook assembly 10 can also be made of all metal or all plastic, depending on the desired objectives. For instance, an all plastic garment hook assembly 10 has the advantages of being a lighter weight than an all metal garment hook assembly 10. In addition, an all plastic garment hook assembly 10 may be manufactured simultaneously with the inner panel 14 of the liftgate assembly 20 in an injection molding process, resulting in lower manufacturing and assembly costs. On the other hand, an all metal garment hook assembly 10 has the advantage of being able to support a greater weight than an all plastic hook.

In one embodiment of the present invention, the base portion 26 of the garment hook assembly 10 is secured to the sheet metal of the vehicle (not shown). The base portion 26 may pass through the inner panel 14 of the liftgate assembly 20 and attach directly to the sheet metal of the vehicle 12 by any conventional method. In one example of a conventional method for attachment, the base portion 26 of the garment hook assembly 10 snap fits into an aperture (not shown) in the sheet metal of the vehicle 12. By directly attaching the base portion 26 of the garment hook assembly 10 to the sheet metal of the vehicle 12, the garment hook assembly 10 has enough support to hold a substantially greater amount of weight than conventional garment hooks.

Alternatively, the garment hook assembly 10 may be attached directly to the inner panel 14 of the liftgate assembly 20. If the garment hook assembly 10 is attached to the inner panel 14 of the liftgate assembly 20, the garment hook assembly 10 may be injection molded simultaneously with the inner panel 14 of the liftgate assembly or may be manufactured separately and attached as a secondary process. As with a metal base portion 26, a plastic base portion 26 of the garment hook assembly 10 may be secured to the inner panel 14 by snap fitting the plastic base portion 26 into an aperture in the inner panel 14 of the liftgate assembly 20.

In another embodiment of the present invention, the hook portion 24 of the garment hook assembly 10 extends to the sheet metal and directly attaches to the sheet metal of the vehicle 12. The base portion 26 of the garment hook assembly 10 acts as a cover over the hook portion 24, covering the bottom segment of the hook portion 24. The inner panel 14 of the liftgate assembly 20 has an aperture (not shown) for the hook portion 24 of the garment hook assembly 10 to pass through. The hook portion 24 may also pass through the base portion 26 if the base portion 26 is integral with the inner panel 14 of the liftgate assembly 20. If the base portion 26 is separate from the inner panel 14, the base portion 26 is placed over the bottom segment of the hook portion 24 and attached to the inner panel 14 of the liftgate assembly 20.

The base portion 26 of the garment hook assembly 10 is pivotally attached to the vehicle 12. In the illustrated embodiment, the garment hook assembly 10 is pivotally attached within the recess 18 of the inner panel 14 of the vehicle 12. The pivotal attachment allows for the base portion 26 of the garment hook assembly 10 to automatically rotate between a raised position, as shown in phantom in FIG. 1, and a lowered position, shown in solid in FIG. 1. The garment hook assembly 10 automatically rotates from the raised position to the lowered position when the liftgate assembly 20 is opened, as shown in FIG. 2.

When the garment hook assembly 10 is in the raised position, the garment hook assembly 10 rests within the recess 18 of the inner panel 14. The recess 18 has a shape that substantially corresponds to the shape of the garment hook assembly 10. The depth of the recess 18 is such that when the garment hook assembly 10 is raised, the garment hook assembly 10, with or without garments 30, is substantially flush with the inner panel 14 of the liftgate assembly 20. When the garment hook assembly 10 is in the lowered position, the hook portion 26 is accessible for hanging garments 30. Upon closing of the liftgate assembly 20, the garments 30 will be positioned completely within the vehicle 12, as best seen in FIG. 3.

One aspect of the present invention is the automatic movement of the garment hook assembly 10 as the liftgate assembly 20 is opened and closed. The garment hook assembly 10 is pivoted within the recess 18 of the inner panel 14 such that the garment hook assembly 10 will automatically deploy to the lowered position upon opening of the liftgate assembly 20 and return to the raised position upon closing of the liftgate assembly 20. Therefore, the garment hook assembly 10 is visible and easily accessible when the liftgate assembly 20 is opened and will not obstruct the view of the driver when the liftgate assembly 20 is closed. In the illustrated embodiment of the present invention, the garment hook assembly 10 is pivotally attached at the left side of the recess 18. However, it can be appreciated that the garment hook assembly 10 can be positioned anywhere within recess 18 so long as the garment hook assembly 10 will automatically deploy to the lowered position upon opening of the liftgate assembly 20 and automatically return to the raised position upon closing of the liftgate assembly 20.

The garment hook assembly 10 of the present invention has many advantages over conventional garment hooks. For example, the garment hook assembly 10 can hold more garments, or a greater weight of garments, than conventional garment hooks. The hook portion 24 of the garment hook assembly 10 is easily accessible. In addition, a person standing outside the vehicle 12 is able to visually see the garment hook assembly 10. By contrast, conventional garment hooks are hidden to someone standing outside of the vehicle 12. Once the garments are secured by the garment hook assembly 10 and the liftgate assembly 20 is closed, the garments remain flush against the side of the vehicle 12 so the driver's field of view is not compromised.

In the illustrated embodiment, the garment hook assembly 10 is mounted to the liftgate assembly 20 for automatic deployment. However, it will be appreciated that the garment hook assembly 10 can be mounted to any location within the interior of the vehicle that will allow the automatic deployment of the garment hook assembly 10, such as a door, or the like. It can also be appreciated that the present invention may be practiced in any type of vehicle closure. For instance, the garment hook assembly 10 can be positioned on a front or rear door of the vehicle. Additionally, the size of the garment hook assembly 10 can vary depending on the desired objectives. A large garment hook assembly 10 may be desired if it is anticipated that the garment hook assembly 10 will be utilized for garments 30 that are heavy. In contrast, a small garment hook assembly 10 may be desired if it is anticipated that the garments 30 will be light in weight, or if there is limited space available in the vehicle, thereby limiting the amount of garments 30. Furthermore, the number of garment hook assemblies 10 can vary per vehicle 12. For example, a sedan may have two garment hook assemblies 10; one above the driver's side rear door and one above the passenger's side rear door. A SUV, for example, may have three or more garment hook assemblies 20; two small garment hook assemblies 20 above the rear doors and one or more large garment hook assemblies 20 on the liftgate 10 of the vehicle 12.

It should be understood that the aforementioned and other various alternatives to the embodiments of the invention described herein may be employed in practicing the invention. It is intended that the following claims define the scope of the invention and that the method and apparatus within the scope of these claims and their equivalents be covered thereby.

What is claimed is:

1. A closure panel assembly for a vehicle, comprising:
    a closure panel selected from the group consisting of a door assembly and a liftgate assembly capable of movement between an open position and a closed position, said closure panel including an inner panel, wherein said closure panel defines a recess; and
    a garment hook assembly including a hook portion and a base portion, said garment hook assembly mounted to said inner panel of said closure panel for movement between a first position and a second position, wherein at least a portion of said hook portion is received in said recess when said garment hook assembly is in said first position based on movement of said inner panel.

2. A closure panel assembly according to claim 1, wherein said closure panel comprises a liftgate assembly of the vehicle, and wherein movement of the liftgate assembly from said closed position to said open position causes said garment hook assembly to move from said first position to said second position.

3. A closure panel assembly according to claim 2, wherein said garment hook assembly is pivotally mounted to said closure panel.

4. A closure panel assembly according to claim 1, wherein said hook assembly is capable of retaining garments when said garment hook assembly is positioned in either said first position or said second position.

5. A closure panel assembly according to 1, wherein at least a portion of said hook portion extends outwardly from said recess when said garment hook assembly is in said second position.

6. A closure panel assembly according to claim 1, wherein movement of said closure panel from the closed position to the open position moves at least a portion of said garment book assembly from an interior of the vehicle to an exterior of the vehicle.

7. An assembly for a vehicle, the vehicle having an interior portion, said assembly comprising:
    a panel adapted to move between an open position and a closed position, and adapted to close out a vehicular opening in the closed position, said panel including an inner panel; and
    a hook assembly mounted to said inner panel that is adapted to pivot between first and second positions, wherein when said panel is closed, said hook assembly is presented to the interior portion of the vehicle, and wherein said hook assembly is adapted to move between said first and second positions based on movement of said panel.

8. An assembly according to claim 7, wherein said hook assembly is adapted to pivot between said first and second positions based on movement of said panel.

9. An assembly according to claim 7, wherein at least a portion of said inner panel defines a recess adapted to house said hook assembly.

10. An assembly according to claim 9, wherein said hook assembly includes a base portion and a hook portion.

11. An assembly according to claim 10, wherein said recess houses said hook portion and said base portion of said hook assembly when said hook assembly is in said first position, and further wherein said hook assembly extends from said recess when said hook assembly is in said second position.

12. An assembly according to claim 7, wherein when said hook assembly moves to said second position, at least a portion of said hook assembly is presented to an exterior of the vehicle.

13. An assembly for a vehicle, the vehicle having an interior portion, said assembly comprising:

a panel adapted to move between an open position and a closed position, and adapted to close out a vehicular opening in the closed position, wherein said panel includes an inner panel; and a hook assembly attached to said panel, wherein said hook assembly is adapted to pivot between first and second positions based on movement of said panel, and wherein at least a portion of said inner panel defines a recess adapted to house said hook assembly.

* * * * *

UNITED STATES PATENT AND TRADEMARK OFFICE
CERTIFICATE OF CORRECTION

| | |
|---|---|
| PATENT NO. | : 7,331,625 B2 |
| APPLICATION NO. | : 10/558353 |
| DATED | : February 19, 2008 |
| INVENTOR(S) | : Steven M. Kowalski et al. |

It is certified that error appears in the above-identified patent and that said Letters Patent is hereby corrected as shown below:

In Claim 6, Column 4, Line 49, please change "book" to --hook--.

Signed and Sealed this

Eighth Day of July, 2008

JON W. DUDAS
*Director of the United States Patent and Trademark Office*